United States Patent [19]

Halin

[11] Patent Number: 5,381,654
[45] Date of Patent: Jan. 17, 1995

[54] THRUST REVERSER SAFETY SYSTEM

[75] Inventor: Yves R. Halin, St. Germain Les Corbeil, France

[73] Assignee: Societe Nationale d'Etude et de Construction de Moteurs d'Aviation (S.N.E.C.M.A), Paris, France

[21] Appl. No.: 917,421

[22] Filed: Jul. 23, 1992

[30] Foreign Application Priority Data

Jul. 24, 1991 [FR] France ............... 91 09370

[51] Int. Cl.⁶ ............................................. F02K 3/02
[52] U.S. Cl. ......................... 60/226.2; 60/39.091; 91/416
[58] Field of Search ............ 60/226.2, 39.091; 244/110 B; 91/415, 416, 432, 445, 464

[56] References Cited

U.S. PATENT DOCUMENTS

| | | | |
|---|---|---|---|
| 2,932,164 | 4/1960 | Watson | 60/39.091 |
| 3,002,497 | 10/1961 | Gulick . | |
| 3,040,524 | 6/1962 | Kurti | 60/226.2 |
| 3,943,715 | 3/1976 | Miyao et al. | 91/416 |
| 3,987,705 | 10/1976 | Strassheimer | 91/416 |
| 4,297,844 | 11/1981 | Halin et al. . | |
| 4,383,647 | 5/1983 | Woodruff et al. | 244/110 B |
| 4,391,409 | 7/1983 | Scholz | 60/226.2 |
| 4,437,783 | 3/1984 | Halin et al. . | |
| 4,608,822 | 9/1986 | Fondacci et al. . | |
| 4,858,430 | 8/1989 | Belbouche . | |
| 4,894,985 | 1/1990 | Dubois et al. . | |
| 4,914,905 | 4/1990 | Dubois et al. . | |
| 4,916,895 | 4/1990 | Dubois . | |
| 4,960,243 | 10/1990 | Dubois et al. . | |
| 4,976,466 | 12/1990 | Vauchel . | |
| 5,039,171 | 8/1991 | Lore . | |

FOREIGN PATENT DOCUMENTS 557040 5/1957 Belgium .
1291936 5/1961 France .

Primary Examiner—Richard A. Bertsch
Assistant Examiner—M. Kocharov
Attorney, Agent, or Firm—Bacon & Thomas

[57] ABSTRACT

A thrust reverser safety system for a turbofan engine is disclosed which is integrated into the hydraulic control system of the thrust reverser door so as to prevent the hydraulic actuator from permitting the thrust reverser door to be forced into its deployed, thrust reversing position. The hydraulic actuator defines a closing chamber which, when acted upon by pressurized hydraulic fluid, urges the thrust reverser door to its closed, forward thrust position. The safety system according to this invention provides a valve associated with the hydraulic control circuit and the closing chamber which prevents the hydraulic fluid from being forced out of the closing chamber. This positively prevents the thrust reverser door from moving to its deployed, thrust reversing position. The valve allows pressurized fluid to pass into the closing chamber so that the thrust reverser door may be normally actuated when desired, but prevents the withdrawal of the pressurized fluid from this closing chamber when the thrust reverser door has been fully closed.

9 Claims, 4 Drawing Sheets

THRUST REVERSER SAFETY SYSTEM

BACKGROUND OF THE INVENTION

The present invention relates to a safety system for a turbofan engine thrust reverser, more particularly such a safety system integrated into the hydraulic control system for the thrust reverser.

Turbofan engines are well known in the art and typically comprise a turbojet engine drivingly connected to a turbofan, usually mounted on the front of the turbojet engine. A turbofan housing, radially displaced from, but generally concentric with the turbojet engine housing defines a cold flow air duct for air driven by the turbofan. In such turbofan engines having a relatively high bypass ratio, thrust reversers are typically provided on the turbofan housing so as to redirect the air passing through the cold flow air duct during landing of the aircraft in order to provide a reverse thrust.

Thrust reversers may assume many different types, but a typical thrust reverser is illustrated in FIG. 1. The thrust reverser comprises a stationary, upstream portion 1 which forms a part of the turbofan housing, a movable portion 2 which redirects the air passing through the cold flow air duct and a stationary, downstream collar 3 which also forms a portion of the turbofan housing. The stationary, upstream portion 1 typically comprises an exterior panel 4 which defines a portion of the exterior surface of the turbofan housing, an internal panel 5 which, in conjunction with the housing for the turbojet engine (not shown) defines boundaries of the cold flow air duct and a frame 6 which interconnects panels 4 and 5. The frame 6 also supports the actuator 7a for controlling the movement of the movable portion 2, which in this instance comprises one or more movable thrust reversing doors 7. The number of such doors may vary depending upon the application of the turbofan engine to a particular type of aircraft and typically comprises 2, 3 or 4 such thrust reverser doors. These doors may be displaced around the circumference of the turbofan housing and, when in their deployed positions redirect the air passing through the cold flow air duct to provide the thrust reversing effect.

FIG. 2 illustrates a pair of such thrust reversing doors 7 in their deployed positions in which the forward, or upstream, edge is displaced radially outwardly from the generally annular turbofan housing. As is well known in the art, a rear, or downstream portion of the thrust reverser doors 7 extend inwardly into the cold flow duct so as to redirect the air outwardly through the turbofan housing and in a forward direction. Each such thrust reverser door 7 is operatively associated with a hydraulic jack or actuator 7a, which typically comprises a cylinder having an extendible and retractable piston rod attached to the thrust reverser door 7.

Such thrust reversers are well known in the art and typical examples of which may be found in U.S. Pat. Nos. 4,894,985; 4,858,430; 4,916,895; 4,914,905; 4,976,466; 4,960,243; and 5,039,171.

These types of thrust reverser doors have proven very effective in providing thrust reversing forces to the air frame with which the turbofan engine is associated and, quite obviously, serious problems may arise if the thrust reverser doors are deployed at an inappropriate time. Accidental initiation of the thrust reversal can cause catastrophic results to the aircraft. A number of devices are known designed to preclude such accidental deployment of the thrust reverser doors. In particular, a mechanical locking device on the thrust reverser door and the support structure are known, as well as a mechanical locking device on the thrust reverser control actuator. In some applications, however, such dual safety devices may be inadequate to preclude all risk of malfunctions, especially when the thrust reverser doors are strongly urged to move to their deployed, thrust reversal positions.

U.S. Pat. No. 4,297,844 illustrates a hydraulic control system for thrust reversers, while U.S. Pat. No. 4,437,783 describes an associated mechanical locking and detecting system for such thrust reversers. None of these known devices, however, have provided the requisite security for preventing the accidental deployment of a thrust reverser door.

SUMMARY OF THE INVENTION

A thrust reverser safety system for a turbofan engine is disclosed which is integrated into the hydraulic control system of the thrust reverser door so as to prevent the hydraulic actuator from permitting the thrust reverser door to be forced into its deployed, thrust reversing position. The hydraulic actuator defines a closing chamber which, when acted upon by pressurized hydraulic fluid, urges the thrust reverser door to its closed, forward thrust position. The safety system according to this invention provides a valve associated with the hydraulic control circuit and the closing chamber which prevents the hydraulic fluid from being forced out of the closing chamber. This positively prevents the thrust reverser door from moving to its deployed, thrust reversing position. The valve allows pressurized fluid to pass into the closing chamber so that the thrust reverser door may be normally actuated when desired, but prevents the withdrawal of the pressurized fluid from this closing chamber when the thrust reverser door has been fully closed.

DETAILED DESCRIPTION OF THE PREFERRED EMBODIMENTS

The safety system according to the present invention will be described in conjunction with an actuating system for a pivoting door-type thrust reverser. However, it is to be understood that the principles disclosed herein may be applicable to any type of thrust reversing system.

Figure 1:
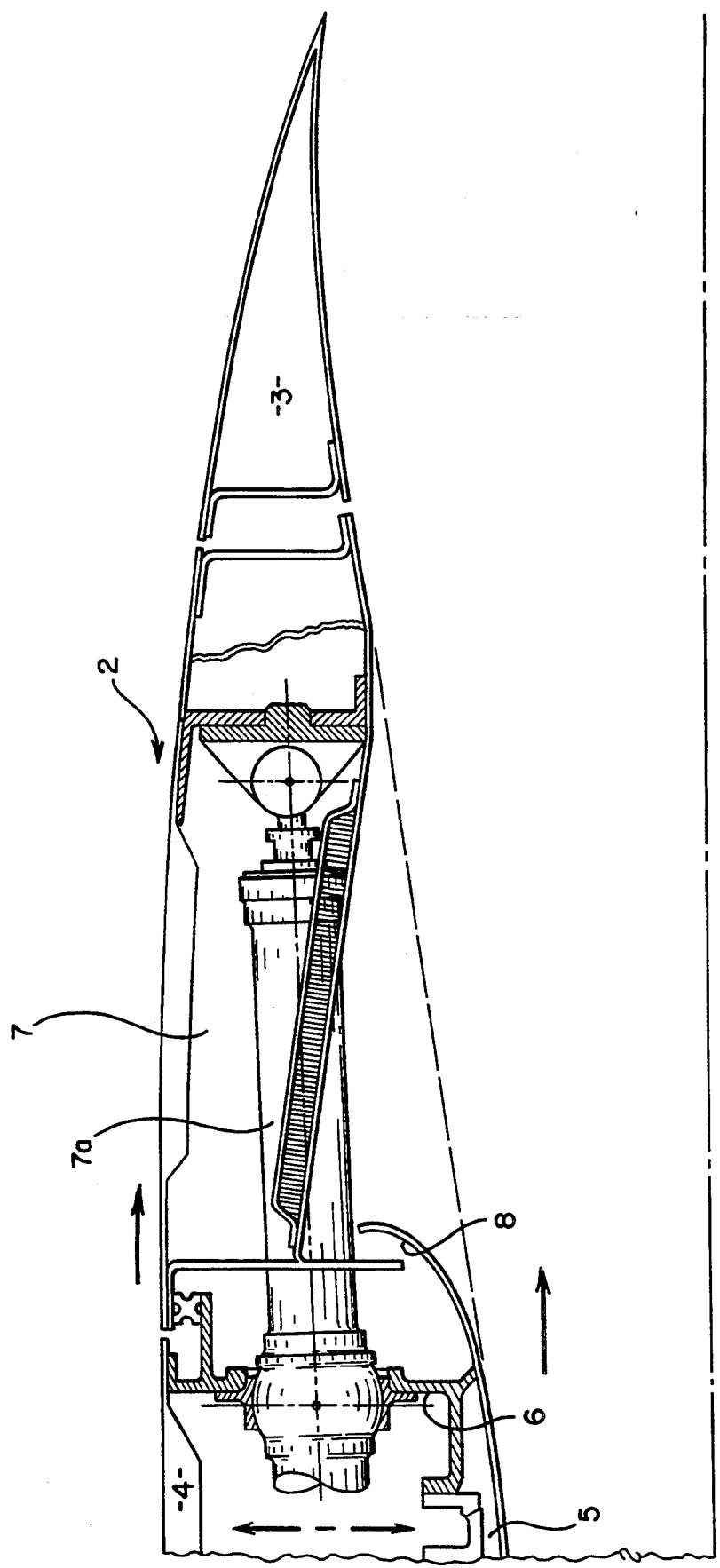
FIG. 1 is a partial, longitudinal cross-sectional view of a turbofan engine housing illustrating a known thrust reverser door system.
Figure 2:
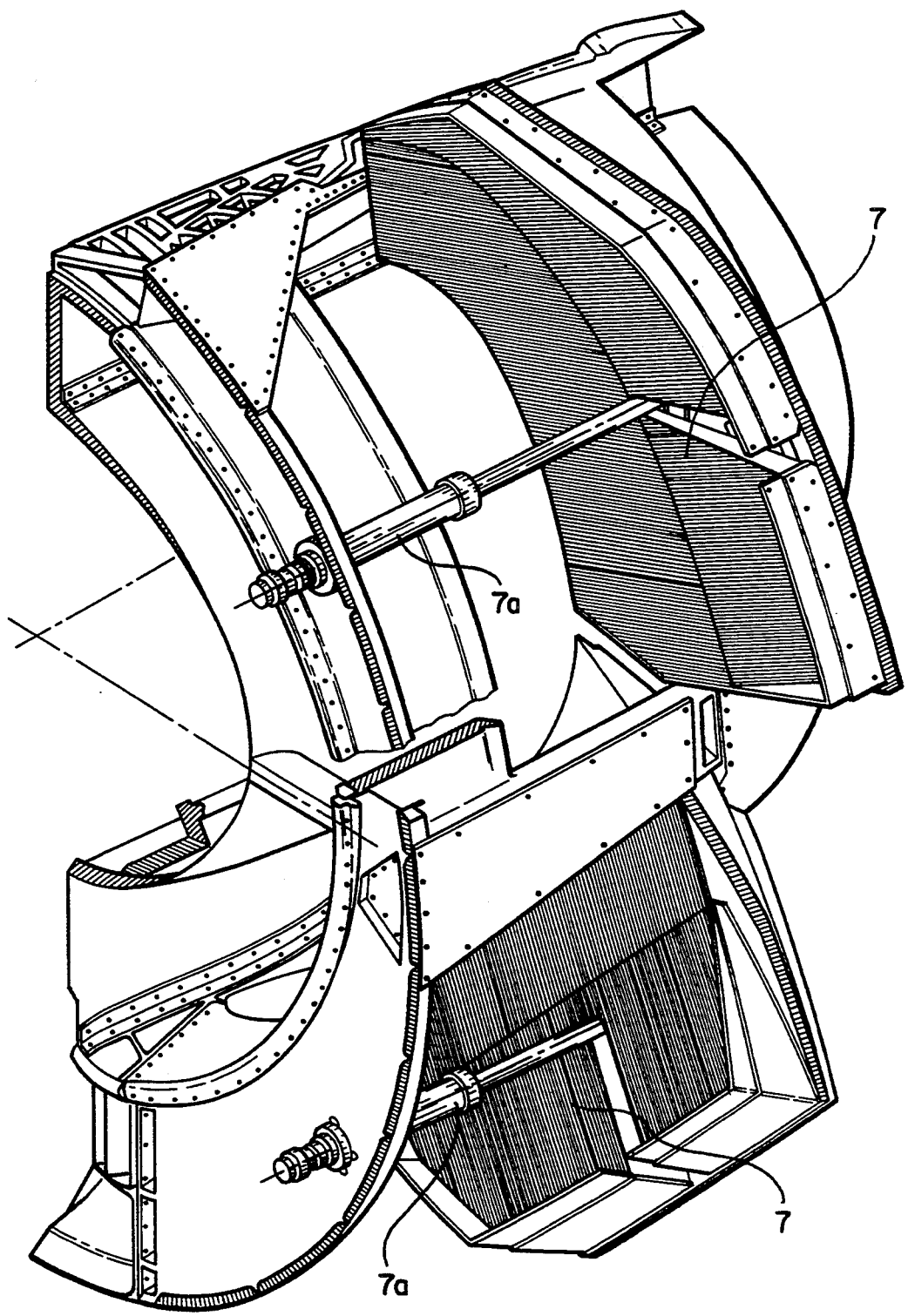
FIG. 2 is a partial, perspective view of the known turbofan housing in FIG. 1 with a pair of thrust reverser doors deployed to their thrust reversing positions.
Figure 3:
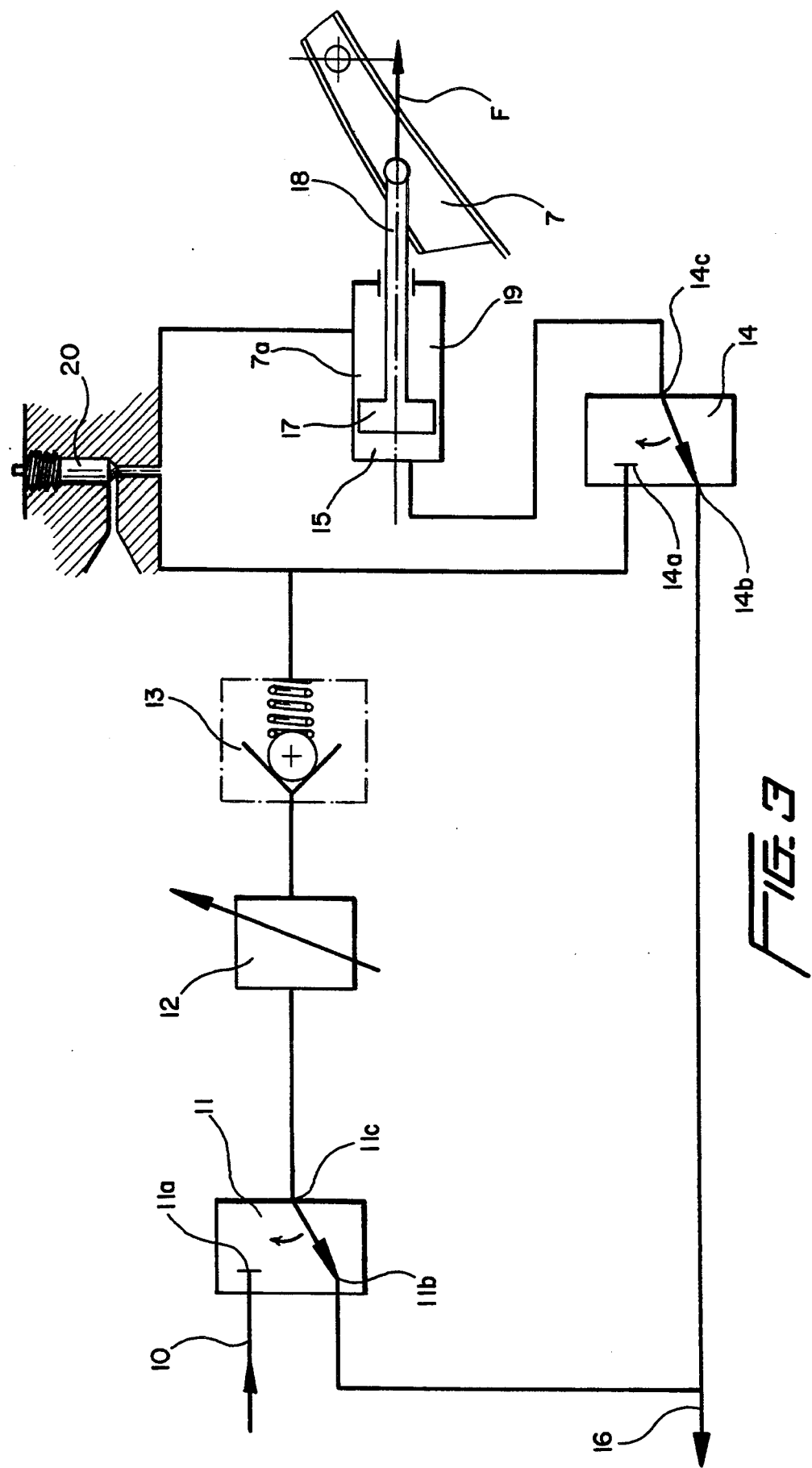
FIG. 3 is a schematic diagram of a hydraulic control circuit for the thrust reverser doors of FIGS. 1 and 2 incorporating the safety system according to the present invention.

As best seen in FIG. 3, hydraulic actuator 7a which controls the movement of thrust reverser door 7 is connected to a hydraulic control circuit having a high pressure fluid intake 10. The high pressure fluid passes through a first, two-position valve 11 having ports 11a, 11b and 11c with port 11a connected to the high pressure fluid supply. Port 11b is connected to the low pressure return line 16. The valve 11 is such that either of these ports may be connected with outlet port 11c. When port 11a is connected to port 11c, the high pressure fluid passes through a flow control valve 12 which may vary the amount of fluid passing therethrough.

The hydraulic circuit also includes a second, two position valve 14 capable of connecting either of ports 14a or 14b with port 14c. Port 14b is connected to the low pressure return line 16, while port 14a is connected to the high pressure fluid inlet through one-way check valve 13. As can be seen, one way check valve 13 allows high pressure fluid to flow from the flow control valve 12 towards the second, two position valve 14. Thus, when port 14a is communicating with port 14c, high pressure fluid is supplied to the first chamber 15 of the actuator 7a via conduit 33. When the second, two position valve 14 is oriented such that port 14b communicates with port 14c, chamber 15 is connected to the low pressure return line 16.

The operation of the aforedescribed hydraulic circuit is as follows: When valve 11 is opened so as to connect port 11a with port 11c, the high pressure fluid passes through the valve 11, proceeds through the flow regulating valve 12 and the one-way check valve 13 to the valve 14. When valve 14 is in its open position, such that port 14a communicates with port 14c, the high pressure fluid is supplied to the chamber 15 of the hydraulic actuator 7a. Such high pressure bearing against piston 17 will extend piston rod 18, thereby causing the thrust reverser door 7 to be moved toward its deployed, thrust reversing position. The positions of the valve 11 and 14 may be automatically controlled by the aircraft control system. Flow regulating valve 12 permits the regulation of the rate of displacement of the movable components of the thrust reverser.

Return of the thrust reverser door 7 to its closed, forward thrust position is implemented by directing the high pressure fluid to the closing chamber 19. This acts on piston 17 to retract the piston rod 18, thereby returning the thrust reverser door 7 to its closed position. During this operation, valve 14 is positioned such that port 14c communicates with port 14b, thereby connecting chamber 15 to the low pressure return line 16.

When the thrust reverser door 7 is in its closed, forward thrust position, if a malfunction should occur in the mechanical locks for the thrust reverser door, aerodynamic forces acting on the thrust reverser door 7 will cause it to exert a force F on the piston rod 18 tending to move the piston 17 toward the right, as illustrated in FIG. 3. Such movement tends to displace the hydraulic fluid out of the closing chamber 19. According to the present invention, the hydraulic fluid in chamber 19 is prevented from exiting the chamber by one-way check valve 13 which prohibits return flow into the high pressure intake portion of the system. Similarly, the hydraulic fluid cannot flow through valve 14, since it is connected to port 14a which, in this position, does not communicate with any other port in this valve. This makes any movement of the thrust reverser door toward its deployed position impossible.

During some maintenance procedures, it may be necessary to manually displace the thrust reverser door 7 toward its deployed position. For that purpose, a bleed valve 20 is incorporated in the hydraulic circuit which permits the hydraulic fluid to be manually bled from the system, thereby permitting the thrust reverser door to be manually displaced towards its deployed position. To prevent air bubbles from forming in the hydraulic circuit while the bleeding operation is being carried out, the bleeder valve 20 is located at the highest point in the hydraulic circuit between the check valve 13 and the actuator 7a. Bleed valve 20 may be manually controlled, or may be connected to a remote control system in known fashion.

In the case of failure of the mechanical locks on the thrust reverser door 7, a force F exerted on piston rod 18 will produce high pressures in the closing chamber 19 and in that part of the hydraulic circuit located between actuator 7a and the check valve 13. Quite obviously, these elements must be of sufficient strength to withstand such high hydraulic pressures.

The thrust reversing system according to the present invention operates such that its sequence of motions always begins with the opening of two position valve 11, resulting in the pressurizing of closing chamber 19 in the actuator 7a. This is carried out regardless of the control direction applied to the thrust reverser to move the door into either its deployed or its closed position.

Figure 4:
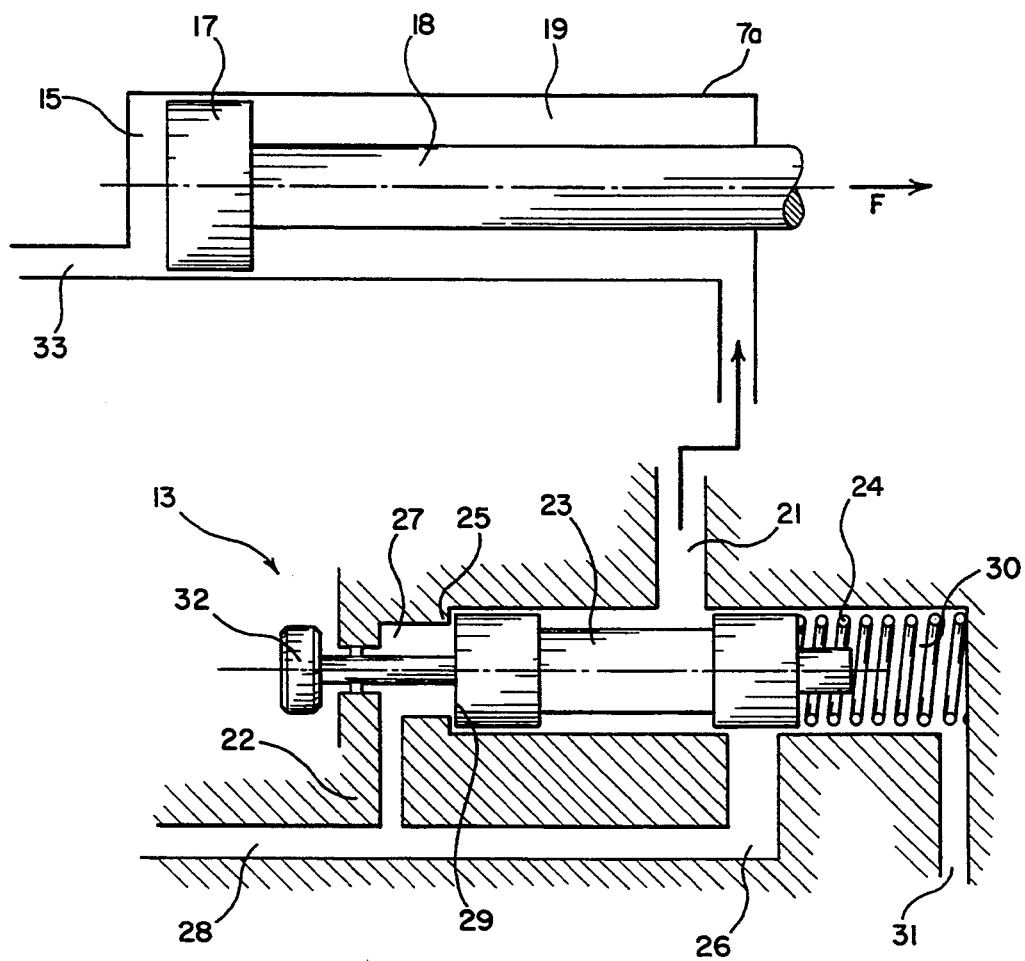
FIG. 4 is a schematic diagram of a first embodiment of a valve structure for the safety system according to the present invention.

FIG. 4 illustrates the system according to the present invention and a first embodiment of a specific valve structure which may be advantageously incorporated into the hydraulic circuit. The valve comprises a body 22 having a piston member 23 slidably mounted therein and which communicates with the closing chamber 19 through conduit 21. The valve body communicates with the high pressure fluid by conduit 28 and conduit 26. Spring 24 biases the piston member 23 towards the left, as seen in FIG. 4, such that face 29 of the piston member 23 bears against stop 25. As can be seen, when the piston member 23 is in this position, conduit 21 does not communicate with either conduits 26 or 28. Thus, should force F be applied to piston rod 18 by aerodynamic forces acting on the thrust reverser door 7 tending to move its toward its deployed position, the hydraulic fluid in closing chamber 19 is blocked and cannot leave the chamber. This positively prevents the thrust reverser door 7 from being inadvertently moved to its deployed position.

During normal operation of the thrust reverser door, high pressure hydraulic fluid is supplied through conduit 28 such that it bears against face 29 of the piston member 23, overcoming the biasing force of spring 24 and thereby moving the valvae member 23 towards the right, as illustrated in FIG. 4. This permits communication between conduits 26 and 21 and allows high pressure hydraulic fluid to enter closing chamber 19. Cavity 30 is connected to the low pressure return line via conduit 31.

A manual control device 32, which is connected to the piston member 23 and which extends to the exterior of valve body 22, allows the piston member 23 to be manually displaced toward the right, as viewed in FIG. 4, to enable actuation of the thrust reverser door during maintenance procedures.

The valve shown in FIG. 4 may be located in the hydraulic circuit so as to control a plurality of actuators 7a, or such valve may be provided for each actuator 7a.

High pressure fluid is applied to chamber 15 through conduit 33 to normally move the thrust reverser door to its deployed position.

Figure 5:
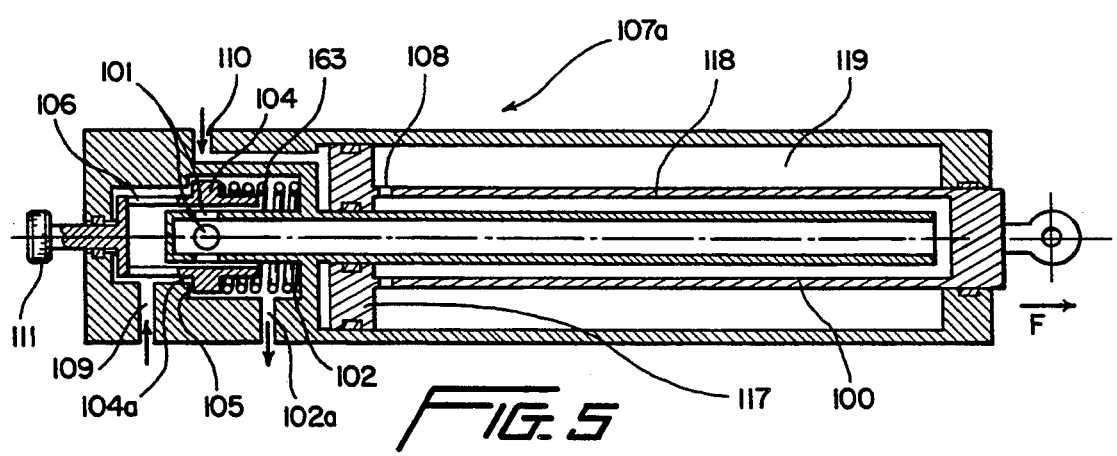
FIG. 5 is a cross-sectional view of a thrust reverser door hydraulic actuator incorporating a second embodiment of a valve for the safety system according to the present invention.

In the embodiment shown in FIG. 5, the control valve is incorporated into the structure of the hydraulic actuating cylinder 107a. In this embodiment, piston 117 is connected to hollow piston rod 118 such that movement of these elements relative to the actuator cylinder moves the thrust reverser door (not shown). The hollow piston rod 118 defines an interior chamber which communicates with one or more apertures 108 such that the interior chamber is in fluid communication with the closing chamber 119.

A hollow tubular member 100 has an open end which extends into the interior chamber defined by the hollow piston rod 118 such that the interior of the hollow tube member is in fluid communication with the interior chamber.

A slide valve member 104 is slidably disposed about a closed end of the hollow tube member 100 and defines openings 106. Spring 163 is disposed in cavity 102 so as to bias the slide valve member 104 towards the left, as viewed in FIG. 5, such that end face 104a bears against stop 105. In this position, the slide valve member 104 closes the openings 101 through the tubular member adjacent its closed end. This prevents the openings 101 from communicating with the high pressure intake conduit 109, and effectively blocks hydraulic fluid from exiting the closing chamber 119. Conduit 102a connects the chamber 102 to the low pressure return line (not shown).

When high pressure hydraulic fluid enters intake conduit 109, it acts on the face 104a of the slide valve 104 thereby urging it to the right, as seen in FIG. 5, and compressing the spring 163. Such displacement of the slide valve member 104 allows openings 101 to communicate with the high pressure conduit 109 through openings 106 formed in the slide valve member 104. Thus, high pressure hydraulic fluid enters the interior of the hollow tube member 100 and flows into the interior chamber defined by the piston rod 118 through the open end of the tubular member 100 and into the closing chamber 119 through apertures 108.

For actuating the device in the opposite direction, the high pressure fluid supplied is directed through intake conduit 110 to act on the opposite side of piston 117. As in the previously described embodiment, manual actuating means 111 is operatively associated with the slide valve member 104 and extends exteriorly of the housing of the actuator 107a to enable the slide valve member 104 to be manually displaced during maintenance operations.

This embodiment prevents the extension of piston rod 118 when acted upon by force F by blocking the escape of hydraulic fluid from the closing chamber 119.

The foregoing description is provided for illustrative purposes only and should not be construed as in any way limiting this invention, the scope of which is defined solely by the appended claims.

I claim:

1. A thrust reverser safety system for a turbofan engine thrust reverser having at least one hydraulically actuated thrust reversing element movable between a closed, forward thrust position and a deployed, reverse thrust position, and a hydraulic circuit for controlling the movement of the element including a pressurized hydraulic fluid intake, comprising:
   a) a hydraulic actuator operatively associated with the movable element and the pressurized hydraulic fluid intake of the hydraulic circuit so as to move the element between its closed and deployed positions, the actuator defining a closing chamber such that the pressurized hydraulic fluid supplied to the closing chamber moves the element to its closed position; and,
   b) valve means operatively associated with the hydraulic circuit and the closing chamber so as to selectively prevent communication between the closing chamber and the pressurized hydraulic fluid intake and to prevent hydraulic fluid from leaving the closing chamber, thereby preventing the element from moving toward its deployed position.

2. The thrust reverser safety system of claim 1 wherein the valve means comprises a one-way check valve located in a conduit supplying pressurized fluid to the closing chamber so as to permit fluid flow into the closing chamber, but prevent fluid flow from the chamber.

3. The thrust reverser safety system of claim 1 further comprising means to bleed the hydraulic fluid from the closing chamber, located between the closing chamber and the valve means.

4. The thrust reverser safety system of claim 3 wherein the bleed means is located at a highest point in the hydraulic circuit between the closing chamber and the valve means so as to prevent entry of air into the hydraulic circuit when bleeding the hydraulic fluid.

5. The thrust reverser safety system of claim 1 wherein the valve means comprises:
   a) a valve body having a first port connected to a high pressure hydraulic line, a second port connected to the closing chamber and passage means interconnecting the first and second parts;
   b) a piston member slidably located in the passage means such that high pressure hydraulic fluid urges the piston member to an open position communicating the first port with the second port; and
   c) biasing means operatively associated with the piston member so as to normally urge the piston member to a closed position preventing fluid communication between the first and second ports.

6. The thrust reverser safety system of claim 5 further comprising manual control means operatively associated with the piston member so that the piston member may be manually moved to its open position.

7. The thrust reverser safety system of claim 1 wherein the hydraulic actuator comprises:
   a) a cylinder;
   b) a piston slidably located in the cylinder, the cylinder defining a closing chamber on one side of the piston;
   c) a piston rod extending from the piston exteriorly of the cylinder, the piston rod defining an interior chamber therein; and,
   d) a hollow tubular member extending from the cylinder and having an open end extending into, and in fluid communication with the interior chamber, whereby the valve means is operatively associated with the hollow tubular member.

8. The thrust reverser safety system of claim 7 wherein the hollow tube member has a closed end and wherein the valve means comprises:
   a) at least one opening defined by the hollow tube member adjacent to the closed end;
   b) a high pressure hydraulic fluid inlet defined by the cylinder;

c) a slide valve member slidably located around the closed end of the hollow tube member, the slide valve member having a piston portion thereon;
d) biasing means operatively associated with the slide valve member so as to normally bias the slide valve member to a closed position preventing fluid communication between the high pressure hydraulic fluid inlet and the at least one opening, whereby high pressure hydraulic fluid acting on the piston portion urges the slide valve member to an open position permitting fluid communication between the high pressure hydraulic fluid inlet and the at least one opening; and,
e) at least one aperture defined by the piston rod such that the interior chamber is in fluid communication with the closing chamber.

9. The thrust reverser safety system of claim 8 further comprising manual control means operatively associated with the slide valve member so that the slide valve member may be manually moved to its open position.

* * * * *